(12) United States Patent
Misra et al.

(10) Patent No.: US 10,241,588 B1
(45) Date of Patent: Mar. 26, 2019

(54) SYSTEM FOR LOCALIZING DEVICES IN A ROOM

(71) Applicant: Piccolo Labs Inc., San Francisco, CA (US)

(72) Inventors: Marlon Misra, San Francisco, CA (US); Neil Raina, San Francisco, CA (US)

(73) Assignee: Piccolo Labs Inc., San Francisco, CA (US)

( * ) Notice: Subject to any disclaimer, the term of this patent is extended or adjusted under 35 U.S.C. 154(b) by 0 days.

(21) Appl. No.: 16/007,864

(22) Filed: Jun. 13, 2018

Related U.S. Application Data

(60) Provisional application No. 62/624,785, filed on Jan. 31, 2018.

(51) Int. Cl.
*G06F 3/041* (2006.01)
*G06F 3/01* (2006.01)
*G06F 3/0488* (2013.01)
*G06F 3/0484* (2013.01)
*G06T 7/73* (2017.01)
*G06T 19/00* (2011.01)

(52) U.S. Cl.
CPC ............. *G06F 3/017* (2013.01); *G06F 3/011* (2013.01); *G06F 3/04883* (2013.01); *G06T 7/74* (2017.01); *G06T 19/006* (2013.01); *G06F 3/04845* (2013.01); *G06T 2207/10016* (2013.01); *G06T 2210/12* (2013.01); *G06T 2210/22* (2013.01)

(58) Field of Classification Search
CPC .. G06F 3/04845; G06F 2210/22; G06F 3/011; G06F 3/04883; G06F 3/017; G06T 2207/10016; G06T 2210/12; G06T 7/74; G06T 19/006
See application file for complete search history.

(56) References Cited

U.S. PATENT DOCUMENTS

| | | | |
|---|---|---|---|
| 2010/0303289 | A1 | 12/2010 | Polzin et al. |
| 2012/0308140 | A1 | 12/2012 | Ambrus et al. |
| 2012/0309517 | A1 | 12/2012 | Al-Ghosien et al. |
| 2013/0278504 | A1 | 10/2013 | Tong et al. |
| 2013/0329947 | A1 | 12/2013 | Wu et al. |
| 2015/0077336 | A1 | 3/2015 | Elangovan |
| 2015/0089453 | A1 | 3/2015 | Dal Mutto et al. |
| 2015/0117708 | A1 | 4/2015 | Guigues et al. |
| 2015/0123890 | A1 | 5/2015 | Kapur et al. |
| 2016/0148417 | A1* | 5/2016 | Kim ................. G06T 19/006 345/419 |
| 2016/0328856 | A1* | 11/2016 | Mannino ................. G06T 7/73 |
| 2017/0197636 | A1 | 7/2017 | Beauvais et al. |

(Continued)

Primary Examiner — Kwin Xie
(74) Attorney, Agent, or Firm — Cognition IP, P.C.; Bryant Lee

(57) ABSTRACT

A method and system may be used to provide a user interface allowing a user to identify electronic devices by placing bounding boxes on a video of scene. The bounding boxes may identify one or more electronic devices. Coordinates of the bounding boxes may be stored to allow determining when a user is gesturing towards one of the bounding boxes. The coordinates of the bounding boxes may be updated by a computer vision process that determines whether one or more electronic devices have been moved. When it is detected that a user is gesturing towards a bounding box, an electronic device associated with the bounding box may be controlled.

13 Claims, 14 Drawing Sheets

(56) References Cited

U.S. PATENT DOCUMENTS

| | | |
|---|---|---|
| 2017/0212590 A1 | 7/2017 | VanBlon et al. |
| 2017/0221243 A1* | 8/2017 | Bedi .................... G06T 11/60 |
| 2017/0255832 A1 | 9/2017 | Jones et al. |
| 2018/0024641 A1 | 1/2018 | Mao et al. |
| 2018/0096690 A1 | 4/2018 | Mixter et al. |
| 2018/0181197 A1 | 6/2018 | Teller et al. |

* cited by examiner

SYSTEM FOR LOCALIZING DEVICES IN A ROOM

CROSS-REFERENCE TO RELATED APPLICATIONS

This application claims the benefit of U.S. Provisional Patent Application No. 62/624,785, filed Jan. 31, 2018, which is hereby incorporated by reference in its entirety.

FIELD OF THE INVENTION

The present invention relates to a user interface for identifying device locations for a gesture control system.

BACKGROUND

An existing problem in gesture control systems is allowing users to easily configure the electronic devices that they wish to control by gesture. For example, systems are needed for identifying the location of electronic devices that may be controlled by a gesture control system.

It would be desirable to have a simple user interface allowing users to easily identify the electronic devices that they want to control with gestures. Moreover, it would be desirable for the system to automatically update the locations of electronic devices as the devices are moved.

SUMMARY OF THE INVENTION

One embodiment relates to a method for allowing control of electronic devices by gesture. Video may be captured and analyzed to determine gestures of one or more users. The gestures of the one or more users may be used to control one or more electronic devices. User interfaces may be provided to allow a user to configure the location of the one or more electronic devices that are subject to the control of the gesture control system.

One embodiment relates to a user interface showing an image or video that allows a user to specify an electronic device that may be controlled by a gesture recognition system. A computer system may monitor video of the scene and determine if the electronic device has been moved. If it is detected that the electronic device has been moved, then the computer system may update stored data indicating the location of the electronic device.

One embodiment relates to a method for determining and updating the location of an electronic device in a gesture control system. The method may include capturing video with a video camera and displaying the video to a user on a computer system. The computer system may receive input from the user viewing the video that indicates a bounding box. The bounding box may outline an electronic device that was displayed in the video. The coordinates of the bounding box may be stored with an image of the electronic device on the computer system. The video camera may continue to capture video and may send the video to the computer system. The computer system may compare an image from the captured video at the location of the stored bounding box with the stored image of the electronic device. The computer system may detect that the electronic device has moved to a new location. The system may update the stored coordinates of the bounding box of the device to its new location.

One embodiment relates to a method for determining and updating the location of an electronic device in a gesture control system. The method may include capturing video with a video camera. The captured video may be transmitted to a mobile device of a user and displayed on its screen in real time. The mobile device may display user interface elements allowing the user to place a bounding box on the video. The bounding box may enclose an electronic device displayed in the video on the mobile device's screen. The video may be cropped based on the bounding box to create an image of the electronic device. Coordinates of the bounding box may be stored and associated with the image of the electronic device. The image of the electronic device may be compared with the portion of the video at the coordinates of the bounding box to determine if the electronic device has moved. The computer system may determine that the electronic device has moved to a new location and may update the coordinates of the bounding box to the new location. The computer system may use the coordinates in a gesture control system and may detect that a user gesture is pointing to the new coordinates of the bounding box. The computer system then transmit a signal to control the electronic device.

DETAILED DESCRIPTION

Figure 1:
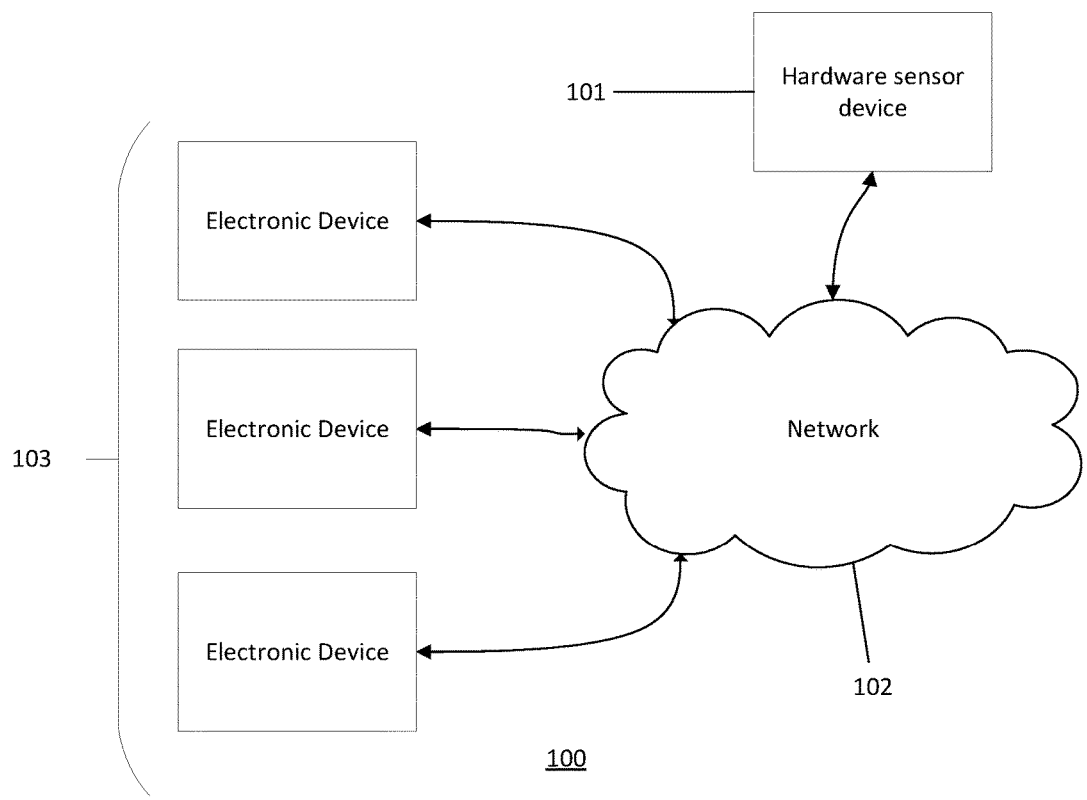
FIG. 1 illustrates an exemplary network environment in which methods and systems herein may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system further includes distributed systems, which are systems of multiple computers (of any of the aforementioned kinds) that interact with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

FIG. 1 illustrates an exemplary network environment 100 in which the methods and systems herein may operate. Hardware sensor device 101 may collect sensor data such as video by using a video camera. Hardware sensor device 101 may capture additional or alternative data using stereo cameras, depth sensors, or other inputs. The hardware sensor device 101 may be connected to network 102. The network 102 may be, for example, a local network, intranet, wide-area network, Internet, wireless network, wired network, Wi-Fi, Bluetooth, or other networks. Electronic devices 103 connected to the network 102 may be controlled according to gestures captured and detected in video by the hardware sensor device 101. Gestures may be detected by processes performed on the hardware sensor device 101 or on other computer systems.

In some embodiments, a computer system, such as hardware sensor device 101, determines coordinates that a user is indicating by gesture. For example, the computer system may determine coordinates that the user is pointing at with an arm, hand, finger, or other body part. The computer system may capture video and other sensor data and process the video and data to determine where the user is pointing. In some embodiments, the computer system performs body pose estimation to determine the pose of the user's body as defined by body part keypoints. The body part keypoints may comprise an identifier of the body part (e.g. a knee), a location defined by an X and Y value, and a confidence value indicating confidence that the this is a correct mapping of the body part. Machine learning models may then be used to predict the state of various parts of the user's body based on the keypoints. For example, one or more body part keypoints may be input to an arm location model, which is a machine learning algorithm, that outputs a prediction of the state of the user's arm. States may be, for example, gestures such as raised, straight, bent, and so forth or directions such as left, right, up, and down. Moreover, the computer system may locate the user's hands by using the body part keypoints and perform additional hand pose estimation specifically on the hands to determine keypoints in the hands themselves. These keypoints define locations of specific parts of the hands, such as the locations of each joint and knuckle. The hand keypoints may be input to a hand location model, which is a machine learning algorithm that outputs a prediction of the state of the user's hand. States may be, for example open, closed, or pointing with an index finger. Based on the arm state, hand state, and body pose, the computer system may determine an overall gesture of the user. If the gesture is a pointing or other indicating motion, the computer system can determine whether the user is indicating.

The computer system may perform a look up of a data structure, such as a database or table, that stores coordinates of electronic devices in the room or scene. The computer system may compare the coordinates of the electronic devices in the data structure with the coordinates that the user is indicating, such as by pointing, to find the nearest electronic device to the indicated coordinates. In some embodiments, the coordinates that the user is pointing at may match coordinates of an electronic device exactly, and, in other embodiments, the coordinates may be close but not match exactly. The computer system may find nearby electronic devices that have coordinates that are near but do not exactly match the coordinates that the user is pointing at. The electronic devices may optionally be stored using a spatial database that allows fast lookup based on coordinates, such as an R-tree or quadtree. When the computer system identifies an electronic device matching the location where the user is pointing, then the computer system may then transmit a signal to control said electronic device. If the computer system determines that no electronic device is near where the user is pointing, then the computer system may take no action. In other words, the computer system may control electronic devices in a room or scene according to the indications of a user, such as by pointing or other gestures.

Electronic devices that may be controlled by these processes may include lamps, fans, televisions, speakers, personal computers, cell phones, mobile devices, tablets, computerized devices, and many other kinds of electronic devices. In response to gesture control, a computer system may direct these devices, such as by transmitting a signal, to turn on, turn off, increase volume, decrease volume, change channels, change brightness, visit a website, play, stop, fast forward, rewind, and other operations.

Figure 2:
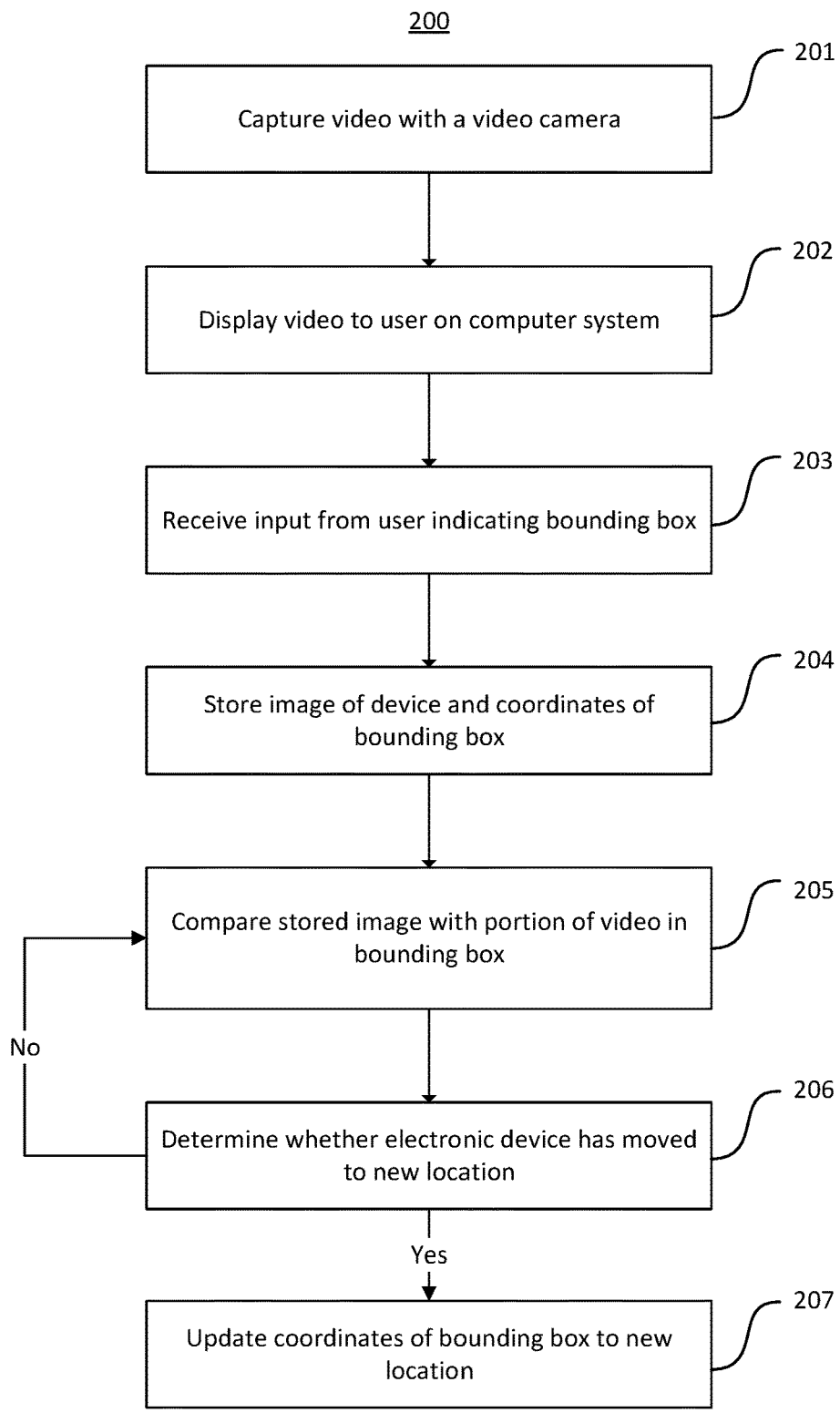
FIG. 2 illustrates an exemplary method that may be performed in some embodiments.

FIG. 2 is a flow chart illustrating an exemplary method 200 that may be performed in some embodiments by a computer system. In step 201, video is captured with a video camera. In step 202, the video is displayed to a user on a computer system. In step 203, input from the user is received on the computer system indicating a bounding box, where the bounding box encloses an electronic device displayed in the video. In step 204, an image of the electronic device and the coordinates of the bounding box may be stored. In step 205, the stored image of the electronic device may be compared with the portion of the video at the coordinates of the bounding box. In step 206, the computer system determines whether the electronic device has moved to a new location. In step 207, if the electronic device has moved to a new location, then the coordinates of the bounding box are updated to the new location. If the system determines the electronic device has not moved to a new location, the system will continue checking and go back to step 205.

Figure 3A:
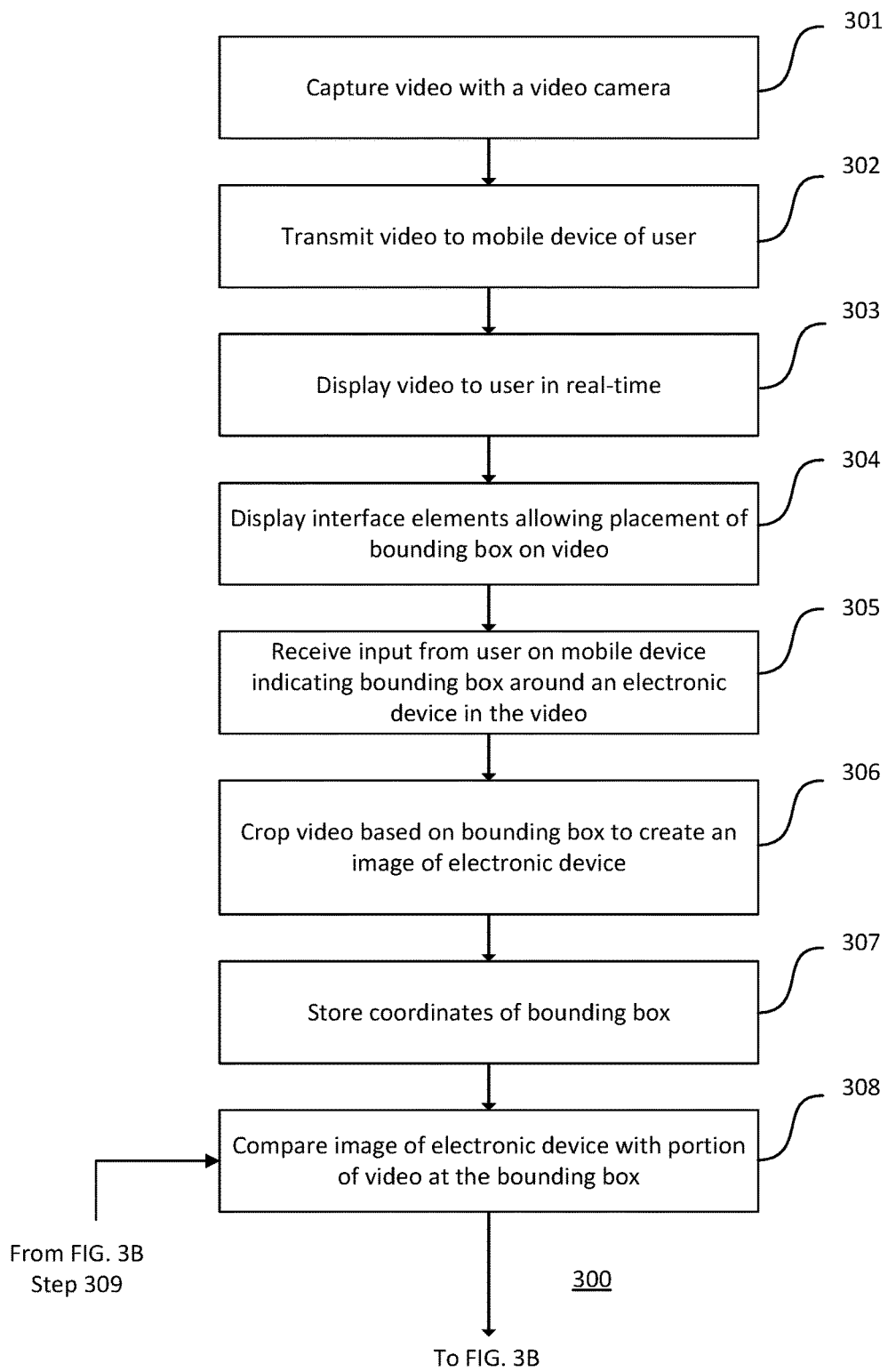
FIGS. 3A-B illustrate an exemplary method that may be performed in some embodiments.
Figure 3B:
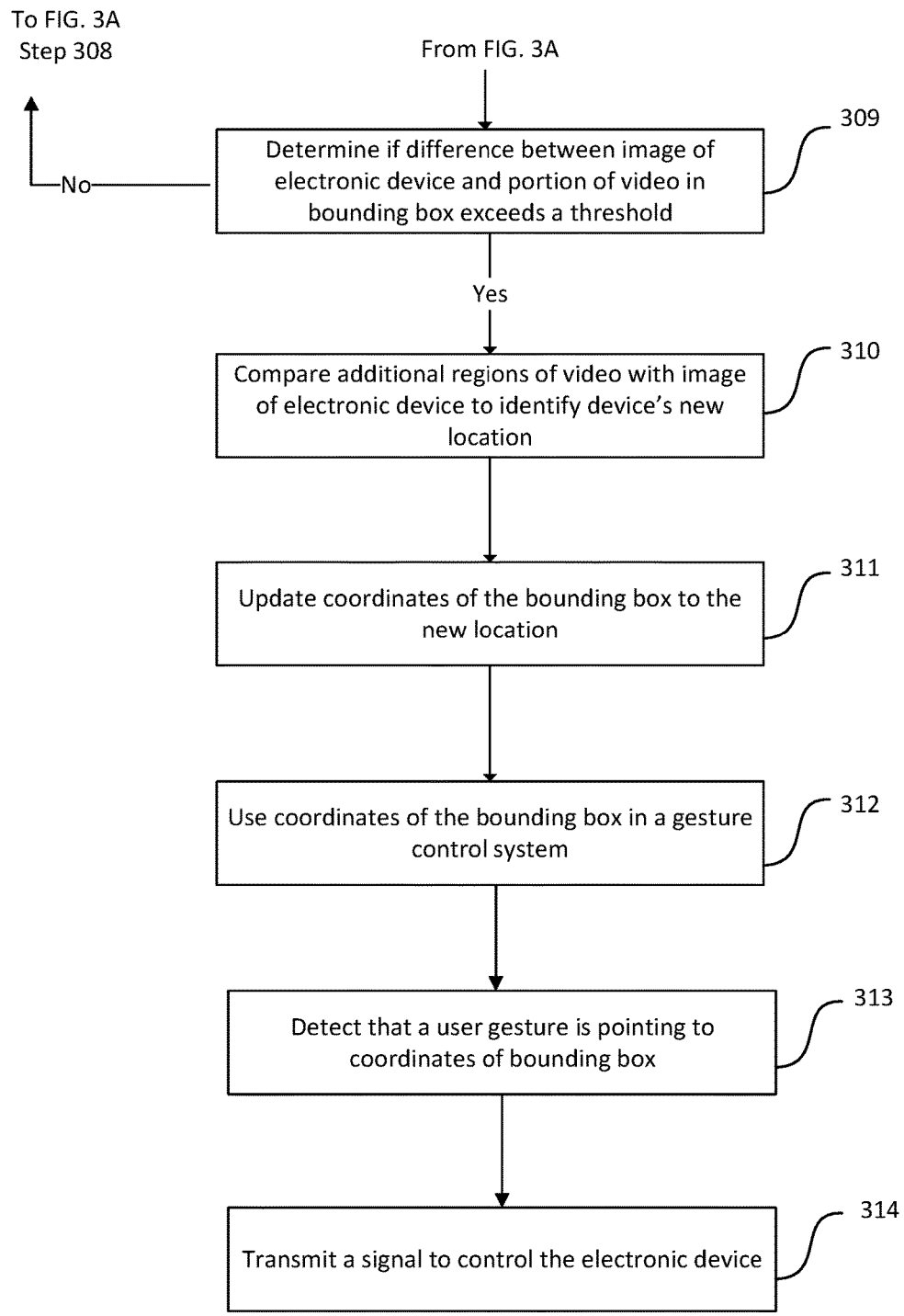

FIGS. 3A-B illustrate a flow chart of an exemplary method 300 that may be performed in some embodiments. In step 301, video is captured with a video camera. In step 302, the video is transmitted to a mobile device of a user. The mobile device may be, for example, a mobile phone, tablet, or other device. In step 303, the video may be displayed to the user in real-time. Some embodiments may stream live video from the hardware sensor device 101 to the user's mobile device so as to provide live streaming video. In step 304, user interface elements are displayed allowing the placement of a bounding box on the video. In step 305, input is received from the user on the mobile device indicating a bounding box, where the bounding box may enclose an electronic device displayed in the video. In step 306, the video is cropped based on the bounding box to create an image of the electronic device. In step 307, the coordinates of the bounding box are stored and associated with the image of the electronic device. In step 308, the image of the electronic device is compared with a portion of the video that is enclosed by the bounding box. In step 309, the difference between the image of the electronic device and the bounded portion of the video is calculated. If the difference does not exceed a threshold, the process may repeat at step 308 to compare the image of the electronic device with a portion of the captured video enclosed by the bounding box. In step 310, if the difference exceeds a threshold, additional regions of the video and the electronic device image are compared to identify the electronic device's new location. In step 311, the coordinates of the bounding box are updated to the new location. In step 312, the new coordinates of the bounding box are used in a gesture control system. In step 313, it is detected that a user's gesture is pointing to the coordinates of the bounding box. In step 314, a signal is transmitted to control the electronic device.

Embodiments may receive an indication from the user of the bounding box around an electronic device in many ways. In one embodiment, a user interface receives input of a bounding box by detecting finger taps on two locations of a user's mobile device touch screen. The computer system forms a bounding box using the two locations as corners of a rectangular bounding box. For example, two taps might be detected and used as the upper left and lower right corners of a bounding box. In another embodiment, a user interface may receive input of a bounding box by detecting four finger taps on four locations of the user's mobile device touch screen. The computer system may generate a quadrilateral bounding box with each tap corresponding to one corner of the bounding box. In another embodiment, two points of contact on a user's mobile device touch screen may be tracked, and the mobile device may decrease the size of a displayed bounding box as the points of contact get closer together and increase the size of the bounding box as the points of contact get farther away. In another embodiment, the bounding box user interface may allow the user to perform a dragging motion on the mobile device touch screen on the corner or side of a displayed bounding box to increase or decrease the bounding box's size.

Figure 9:
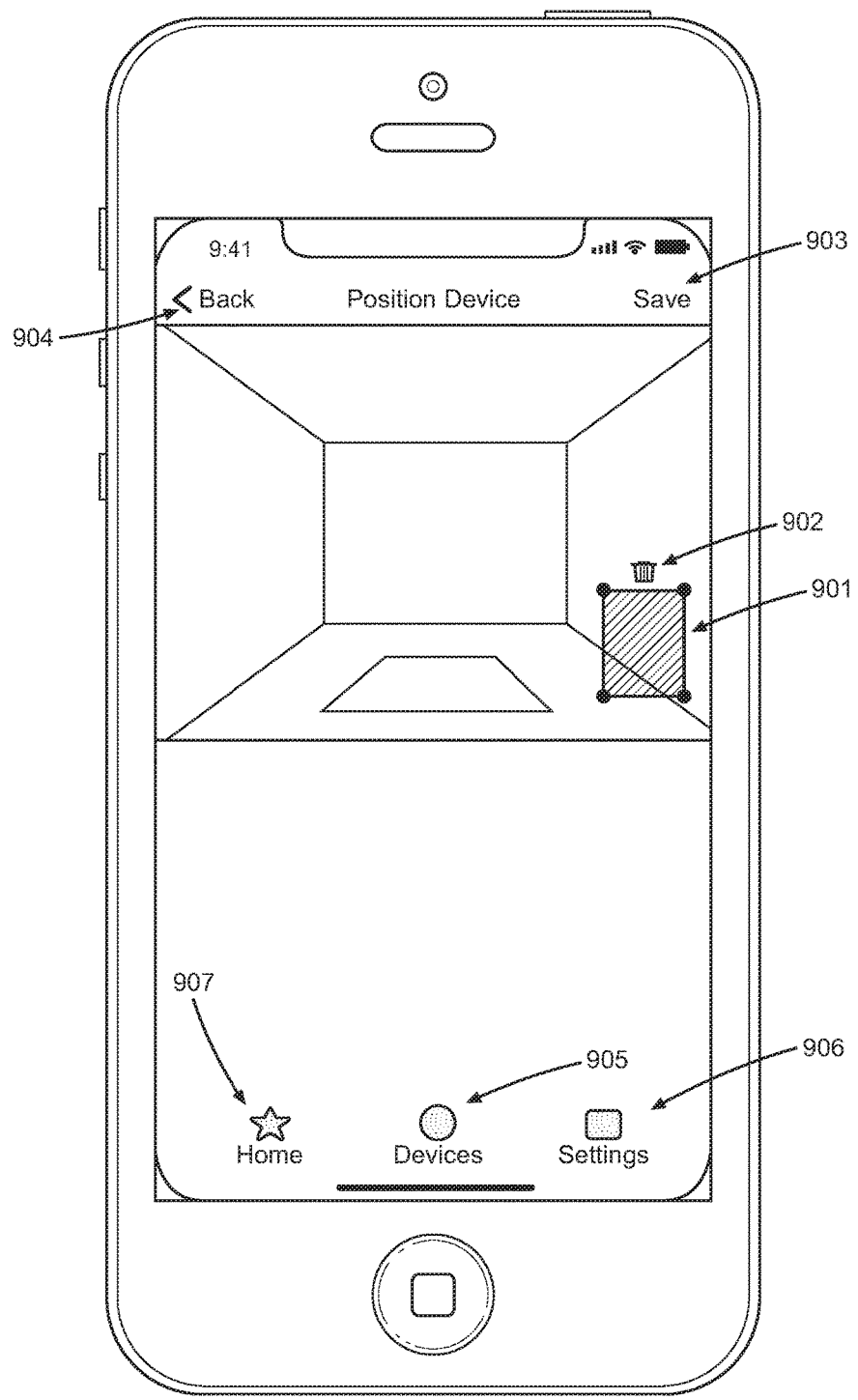
FIG. 9 illustrates an exemplary user interface for adjusting the location of a bounding box.

FIG. 9 illustrates an exemplary embodiment including user interface elements allowing the user to adjust the location of a bounding box 901 displayed on the mobile device touch screen. In one embodiment, the four corners of bounding box 901 are interactive elements that may be moved to a different location. For example, the mobile device may receive a press down event on a corner of the bounding box 901 and a drag event. In response to the drag event, the mobile device may move the corner of the bounding box 901 to the end location of the drag event. This allows the mobile device to move any or all of the four corners of a bounding box 901 according to user input. A garbage icon 902 allows the user to delete the bounding box. Upon receiving a tap event on the garbage icon 902, the mobile device deletes the bounding box and removes it from the display. Save button 903 allows the user to save bounding boxes that he created. In response to the save button 903 being activated, the mobile device saves bounding box 901 and other bounding boxes in a database or table for later retrieval. The Back button 904 allows navigating back to a previous screen. In response to activation of back button 904, the mobile device navigates the application to the previous screen. Also on the mobile device screen, Devices button 905 allows navigation to the devices screen where the user's devices are displayed along with their bounding boxes. The Settings button 906 allows navigation to a settings screen of the application where settings may be configured. The Home button 907 allows navigation to the home screen of the application.

While embodiments have been described where user input is received on a mobile device to create or adjust bounding boxes, other embodiments allow the user to create or adjust bounding boxes on a desktop or laptop computer using a mouse. In the embodiments described in this patent, the use of a mobile device may be replaced by a desktop or laptop computer. Tap events on the mobile device may be replaced by clicks of a mouse and tap and drag motions by a user's finger may be replaced by a drag motion of a mouse.

For the purpose of gesture control and other applications such as home security, object tracking, inventory systems, and so on, it may be advantageous to detect the movement of electronic devices or other objects, such as lamps, televisions, chairs, tables, and so on, in a room or environment. An embodiment may present a simple interface in which the user can specify where devices are located in a room or environment. The interface may be overlaid on still or video images of the room or environment on the user's computer screen or mobile device touch screen. The user may be able to select from a predetermined set of bounding boxes or may be able to create their own bounding box around one or more electronic devices or objects in the room or environment. An embodiment may also allow the user to resize, move, and reproduce bounding boxes to better represent the devices or objects and their respective locations in the room or environment. Another embodiment may have an automated process by which a camera, sensor device, or other computer system may detect changes and movement of electronic devices or other objects in portions of video enclosed by a bounding box when the video is compared to a previously stored image of the electronic devices or other objects.

Many variants of the described processes are possible. The processes herein such as, but not limited to, methods 200 and 300 may have more or fewer steps. Steps of the methods 200 and 300 are optional and may be omitted. Moreover, the steps may be performed in different orders or in parallel.

It is contemplated that methods 200 and 300 may be performed on scene involving two more electronic devices and/or objects. The methods 200 and 300 may be performed for each device or object. For example, input bounding boxes may be received from the user for multiple electronic devise in a scene, such as one bounding box per electronic device. An image of each electronic device may be collected by cropping the video at each bounding box, and the coordinates of each bounding box may also be stored. Comparison of stored images to portions of video in a bounding box may be performed for each bounding box and image created. Multiple devices and objects may be further grouped into larger, logical and/or physical bounding boxes. Devices or objects in these larger groups may be similar in location and/or function. Movement detection within any single device in a group may affect one or more other devices in the group. Gesture control directed toward any single device in a group may affect one or more other devices in the group.

One embodiment may detect motion, calculate movement, and control electronic devices from a single, dedicated, physical device. Another embodiment may split the responsibilities into multiple electronic devices and computer systems. For example, motion may first be detected via a motion sensor and transmitted to a video camera that captures the video. The video may then be transmitted to a user's mobile device where calculations may be done to detect if devices or objects have moved. This information may then be sent to a computer system for storage and further analysis. Sometimes, it may be desirable to have all data and information sent to a central location. One embodiment may have all sensor data, videos, user input of bounding boxes, and so on, sent to a central computer system for processing. In this way, steps 301-314 may occur on one system, may each occur on disparate systems, or may occur in a combination of multiple systems.

In one embodiment, the bounding boxes are two dimensional. In other embodiments, the bounding boxes are three dimensional. The user interface may allow the user to create bounding boxes that are three dimensional and thus allow both the user and system to differentiate multiple devices and objects in multiple planes. Three dimensional bounding boxes may be generated by the computer system in response to user input. In some embodiments, one or more taps or clicks may be received from the user to identify corners of a three dimensional bounding box. In other embodiments, two points of contact on a user's mobile device touch screen may be tracked, and the mobile device may decrease the size of a displayed three dimensional bounding box as the points of contact get closer together and increase the size of the three dimensional bounding box as the points of contact get farther away. Steps 304-306 may show interface elements to allow selection in a three dimensional space. Steps 307-311 may perform calculations on three dimensional coordinates. Additionally, one embodiment may include two or more cameras capturing the environment from different angles. This may allow the system to more accurately calculate movement across multiple planes and allow detection of rotational movement in the same location. One embodiment may add a depth sensor that may aid the system in mapping locations of devices and objects in a three dimensional space. At steps of methods 200 and 300 where the image frame is cropped, the images from the additional cameras and depth sensor may also be cropped around the user selected bounding boxes.

Another embodiment may replace or supplement the user interaction with a computer system that is able to detect objects automatically. At steps of methods 200 and 300 where input is received from the user indicating a bounding box, a computer system tasked with object identification may create the bounding boxes around the detected objects by conforming the bounding boxes to the edges of the object and also automatically store an identifier of the type of object it is, and subsequent steps may continue. The computer system may also take input from the user as in steps 203 and 305 to increase the accuracy at which it is able to detect objects within a room or environment.

In some embodiments, input may be received from the user indicating a specific device to create a bounding box for, and the mobile device may automatically predict a location of the bounding box for the specific device and display it to the user. Input from the user may be received in the form button presses or menu selections indicating a device to create a bounding box for. Alternatively, input from the user may be received in the form of natural text, or as speech, indicating that the user wants to create a bounding box for a specific device, for example: "I want to map a lamp." The system may predict the location of that device. The system may generate the prediction based on past locations of the bounding box for the device or based on object detection algorithms that use machine learning to automatically identify objects and their locations from digital images. Based on the predicted location, the system may generate coordinates of a bounding box enclosing the predicted location of the specific device. The bounding box may be slightly larger than the specific device to allow a visual buffer allowing the device to be easier to see on the user interface. The system may then display the bounding box, at the bounding box coordinates, to the user. The system may display user interface elements allowing the user to adjust the suggested bounding box.

Figure 4:
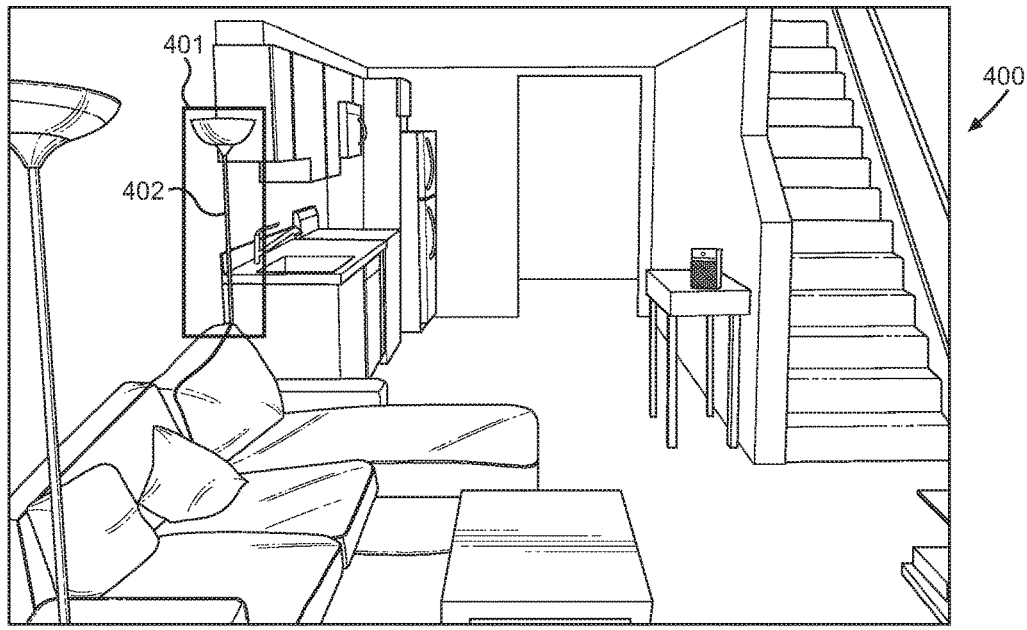
FIG. 4 illustrates an exemplary image frame of a video where a bounding box is displayed in response to user input.

FIG. 4 illustrates an exemplary image frame 400 of a video where a bounding box 401 is displayed in response to user input. The bounding box 401 may be created in response to user input such as a tap, click, swipe, pinch, or expand motion. In this example, the bounding box 401 encloses a lamp 402 that is subject to control by the gesture control system. Such an image frame may be collected from a video camera, such as in hardware sensor device 101.

Figure 5:
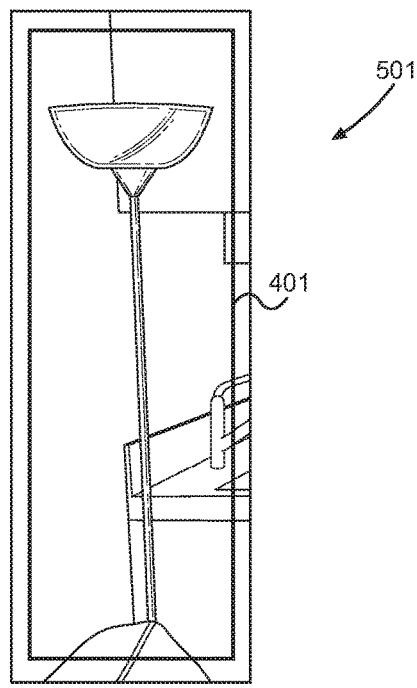
FIG. 5 illustrates an exemplary cropped image frame from the video, which has been cropped according to the bounding box.

FIG. 5 illustrates an exemplary cropped image frame 501 from the video, which has been cropped according to the bounding box 401. The cropping may be performed exactly based on the coordinates of the bounding box 401 or may be somewhat larger or smaller than the bounding box 401 to provide leeway.

Figure 6:
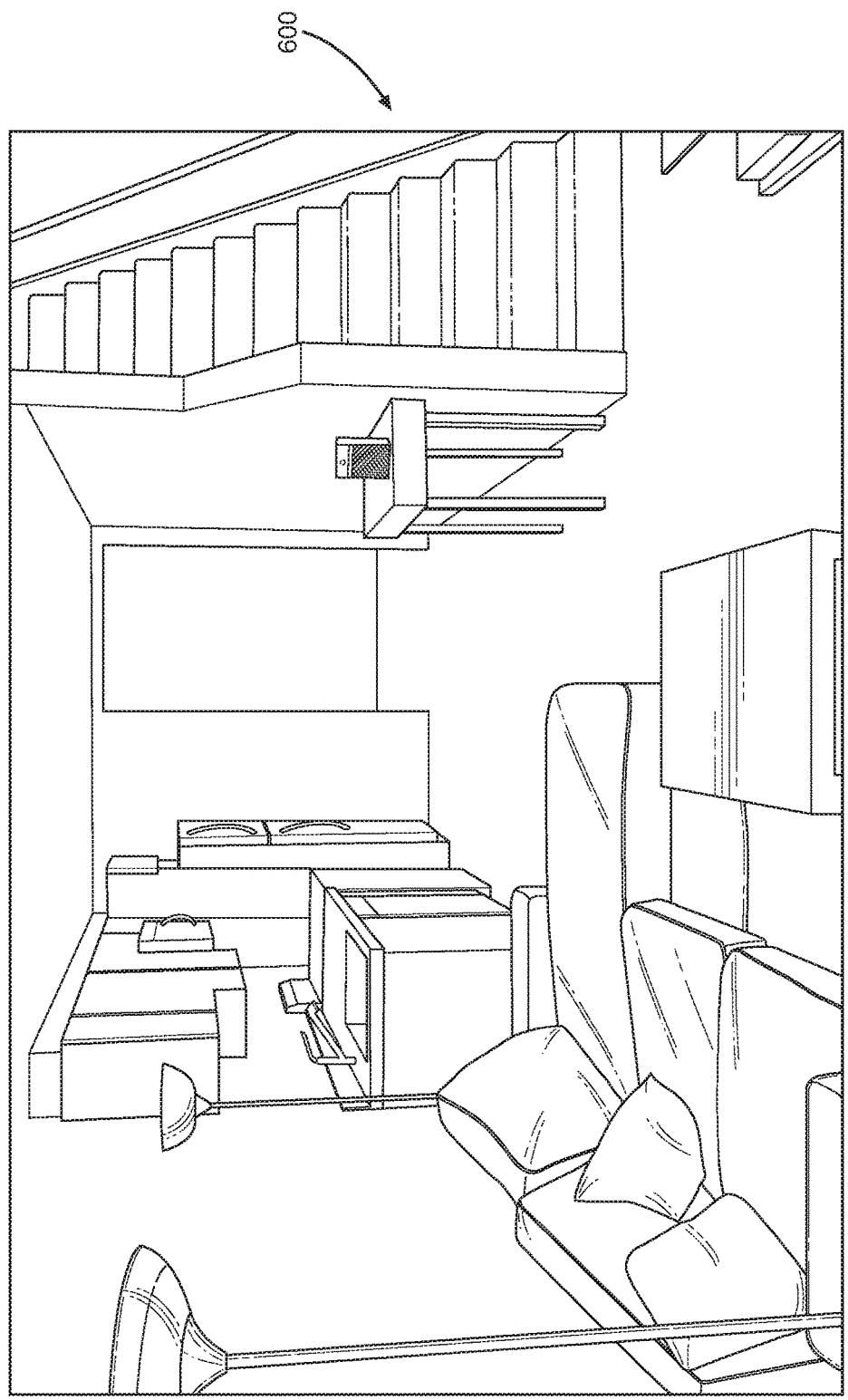
FIG. 6 illustrates an exemplary new image frame of the video that may be used in the detection of movement of an electronic device.

FIG. 6 illustrates an exemplary new image frame 600 of the video that may be used in the detection of whether the electronic device has been moved or not. The computer system detects that the electronic device 402 is no longer in the same location as the coordinates of the original bounding box 401. The computer system searches other regions of the video to determine the new location of the electronic device 402. It may start by searching regions near the original bounding box coordinates using a heuristic that electronic devices may be expected to be moved to nearby locations. When the electronic device 402 is found, the search may be halted and the bounding box coordinates updated. When the electronic device 402 is not found in the nearby regions of the image, the computer system may search regions of the video that are farther and farther from the original bounding box coordinates. In some situations, the computer system may determine that an electronic device 402 is no longer in the scene.

Figure 7:
FIG. 7 illustrates an exemplary bounding box determined from the system detecting the new location of a moved electronic device.

FIG. 7 illustrates an exemplary bounding box 701 that has been determined by the system by detecting a new location of the electronic device after it has been moved in the scene.

Figure 8:
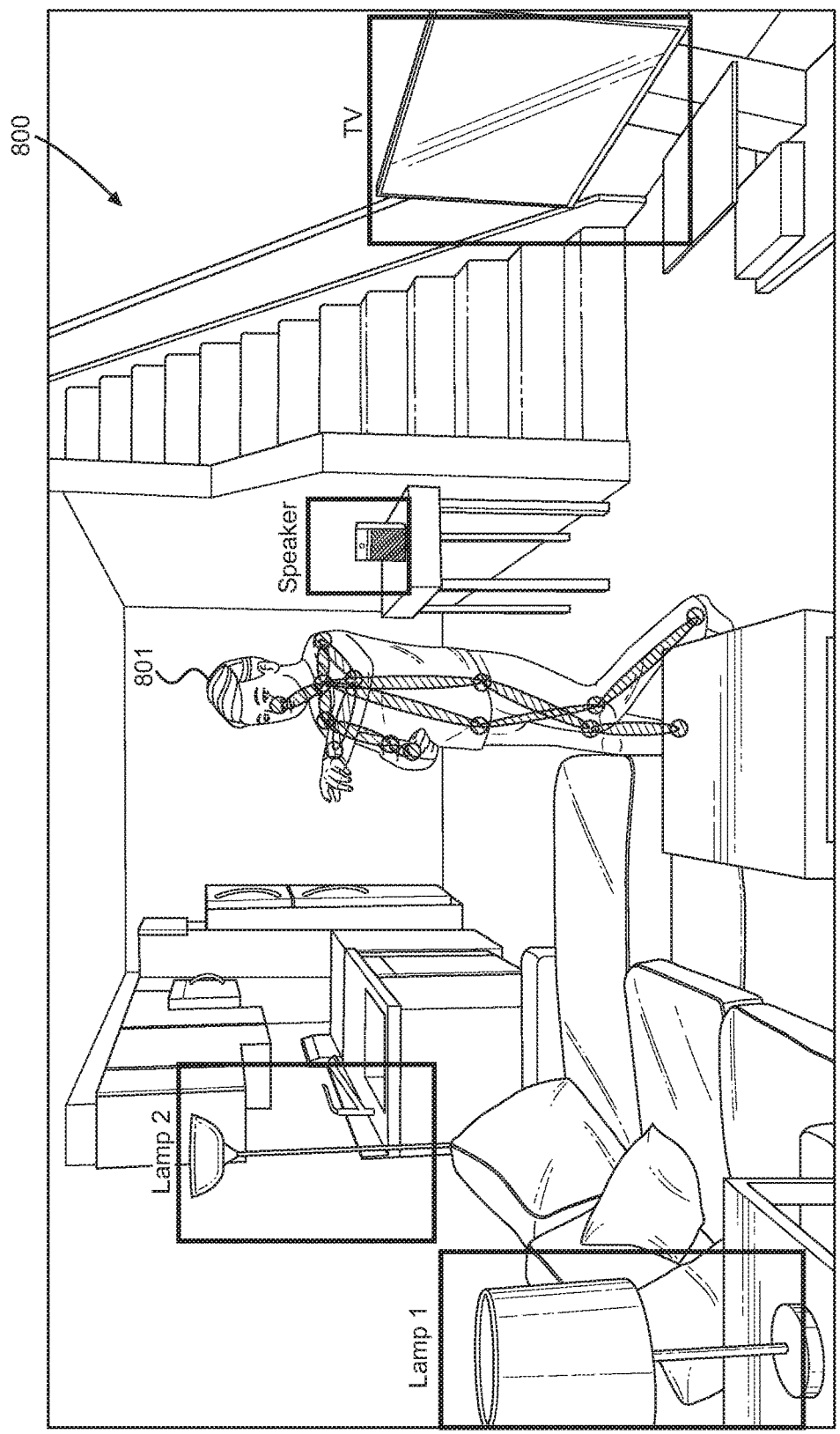
FIG. 8 illustrates an exemplary scene collected from a video camera.

FIG. 8 illustrates an exemplary scene 800 captured from a video camera. In this image, one user 801 is shown using the gesture control system. The controllable electronic devices are identified by the bounding boxes, which were previously specified by one or more users. In this image, these devices are also labeled in text as "Lamp 1", "Lamp 2", "Speaker", and "TV". The user 801 may actuate the gesture control system by pointing at an electronic device and performing some gesture. For example, if the user 801 points at "Lamp 1" and performs the gesture for "On", the lamp referred to by label "Lamp 1" at the location the user is pointing to may turn on. The system may continually track the identified devices via the bounding boxes and detect when movement of those devices has occurred, whereupon it may update the coordinate locations of the devices. By updating the location of moved devices, the gesture control system may still allow users to control devices that have changed their location. Following the previous example, if the electronic device referred to as "Lamp 1" were to move from its original location to a new location, the user may still be able to point at the device referred to as "Lamp 1" at its new location and perform the gesture for "On". Since the system has updated the device's bounding box to the new location, the electronic device referred to as "Lamp 1" may then turn on.

Figure 10A:
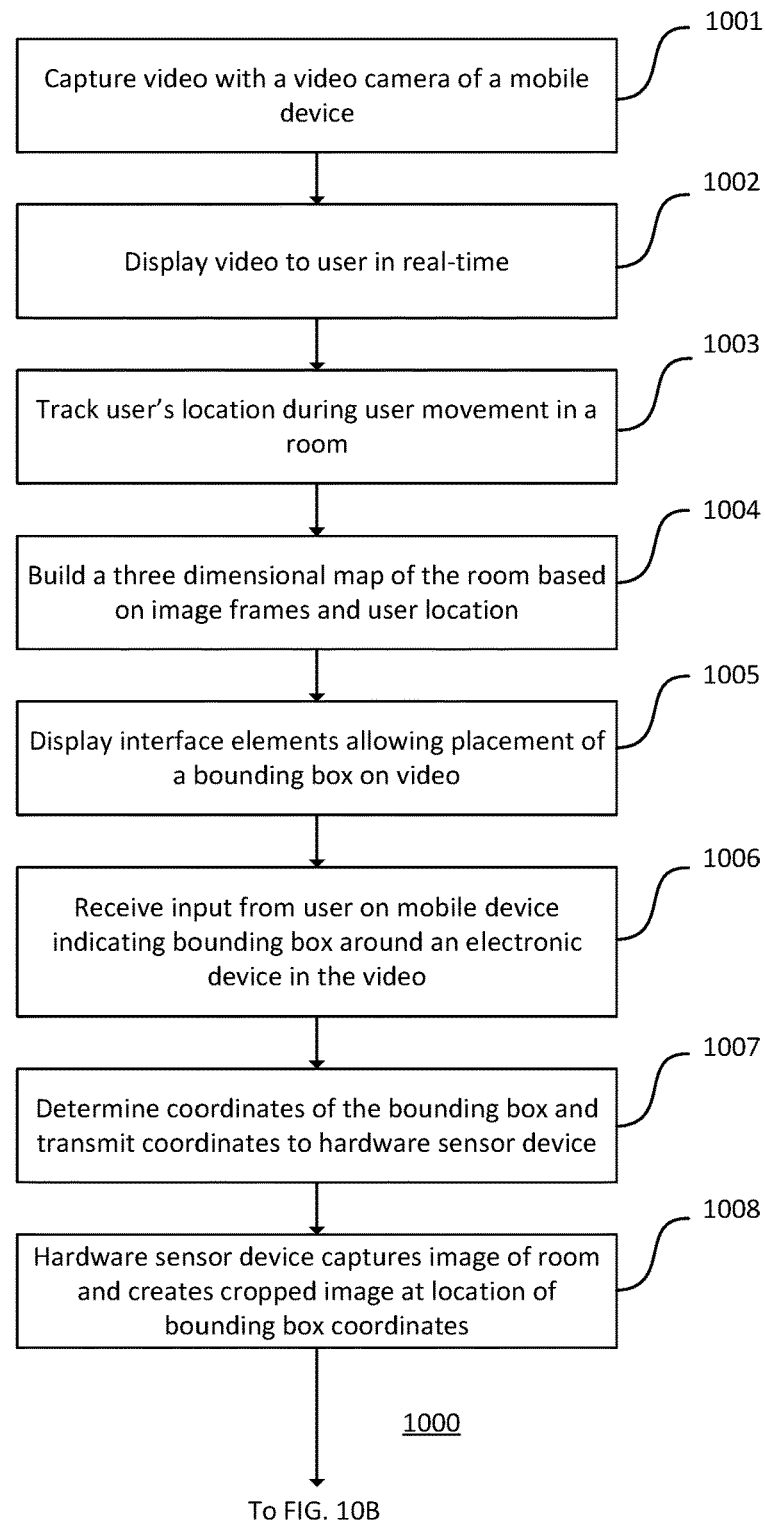
FIGS. 10A-C illustrate an exemplary method for placing bounding boxes that may be performed in some embodiments.
Figure 10B:
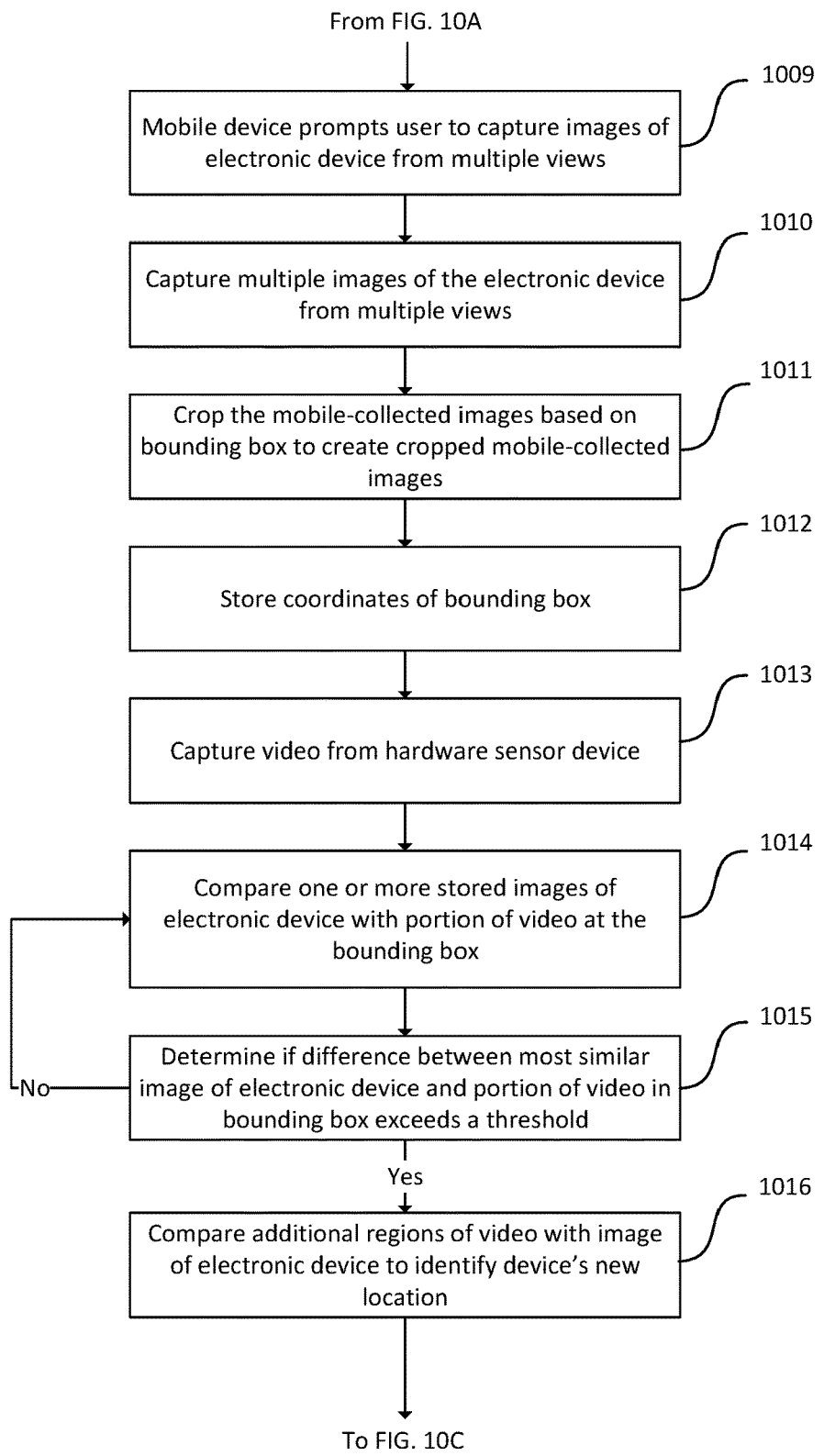
Figure 10C:
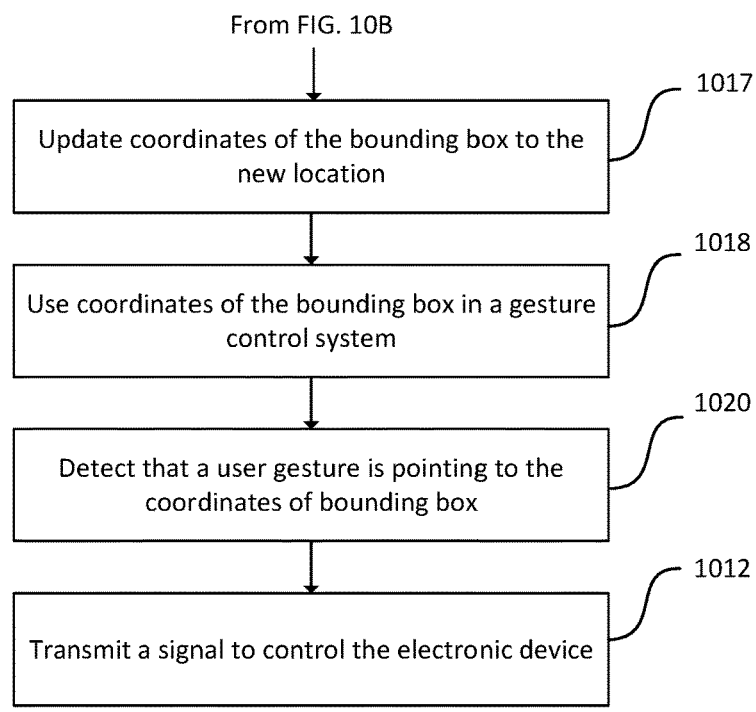

FIGS. 10A-B illustrates a flow chart of an exemplary method 1000 that may be performed in some embodiments. In method 1000, a user wishes to place bounding boxes on electronic devices in a room by using the video camera on his mobile device rather than the video camera on the hardware sensor device 101. In this example, the hardware sensor device 101 is in the same room as the user.

In step 1001, video is captured with a video camera on a mobile device. The mobile device may be, for example a mobile phone, tablet, or other device. In step 1002, the video is displayed to the user in real time. In step 1003, as the user walks around the room, the user's location in the room is tracked. Some embodiments may track the user's movement with sensors on the mobile device, such as one or more accelerometers or pedometers. Some embodiments may track the user's movement by location services such as the Global Position System (GPS) or localization based on triangulation of Wi-Fi or other electromagnetic signals. Some embodiments may track the user's movement based on changes in the video collected from the video camera. Movement may be detected based on changes in sequential image frames, and the mobile device may estimate the movement of the user based on the difference between image frames. The user's location may be updated based on the detected movement. Moreover, the direction of facing of the video camera may also be tracked using any of the above mechanisms.

In step 1004, the mobile device builds a three dimensional map of the room based on the image frames collected from the video camera at different user locations. In step 1005, user interface elements are displayed allowing the placement of a bounding box on the video. In step 1006, input is received from the user on the mobile device indicating a bounding box, where the bounding box may enclose an electronic device displayed in the video. In step 1007, the mobile device may determine the coordinates of the bounding box provided by the user and transmit the coordinates to the hardware sensor device 101. In step 1008, the hardware sensor device 101 may capture an image of the room and create a cropped image at the location of the bounding box entered by the user to create a sensor-collected image of the electronic device.

Alternatively to steps 1007 and 1008, the hardware sensor device 101 may capture a video or image of the room and transmit it to the mobile device. The mobile device may then create a cropped image at the location of the bounding box entered by the user to create a sensor-collected image of the electronic device.

Optionally, the mobile device may prompt the user to collect more video data of the electronic device to provide further images of the electronic device. In step 1009, the mobile device may prompt the user to walk around the electronic device to capture image frames of it from multiple angles. In step 1010, multiple images of the electronic device may be captured from the mobile device. In step 1011, the mobile device may crop the one or more images of the electronic device based on the bounding box and store these mobile-collected images in the same database as the sensor-collected image of the electronic device. In some embodiments, the mobile-collected images may be transformed such as by scaling, rotation, or by affine or non-affine transforms to normalize the perspective of the images to be similar to the perspective of the hardware sensor device 101.

In step 1012, the coordinates of the bounding box are stored and associated with the one or more images of the electronic device. In step 1013, video is captured from the hardware sensor device 101. In step 1014, one or more stored images of the electronic device are compared with a portion of the video from the hardware sensor device that is enclosed by the bounding box. In step 1015, if there is only one stored image of the electronic device, then the difference between the image of the electronic device and the bounded portion of the video is calculated. If there are multiple stored images of the electronic device, then the image of the electronic device that is most similar to the portion of video is selected. The difference between this most-similar image of the electronic device and the bounded portion of the video is calculated. If the difference does not exceed a threshold, the process may repeat at step 1014 to compare the one or more images of the electronic device with a portion of the captured video enclosed by the bounding box.

In step 1016, if the difference exceeds a threshold, additional regions of the video and the electronic device image are compared to identify the electronic device's new location. In step 1017, the coordinates of the bounding box are updated to the new location. In step 1018, the new coordinates of the bounding box are used in a gesture control system. In step 1019, it is detected that a user's gesture is pointing to the coordinates of the bounding box. In step 1020, a signal is transmitted to control the electronic device.

Figure 11A:
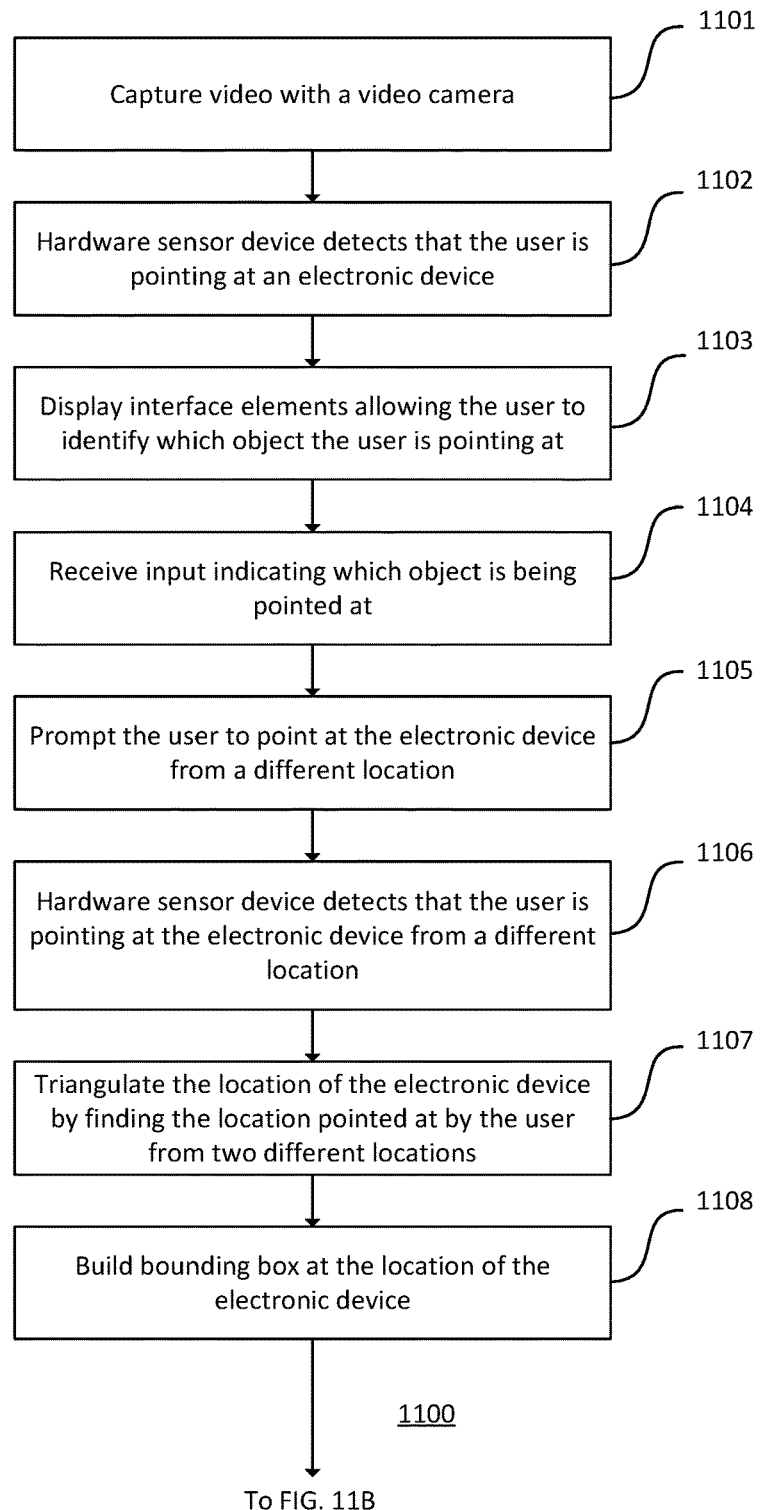
FIGS. 11A-B illustrate an exemplary method for placing bounding boxes that may be performed in some embodiments.
Figure 11B:
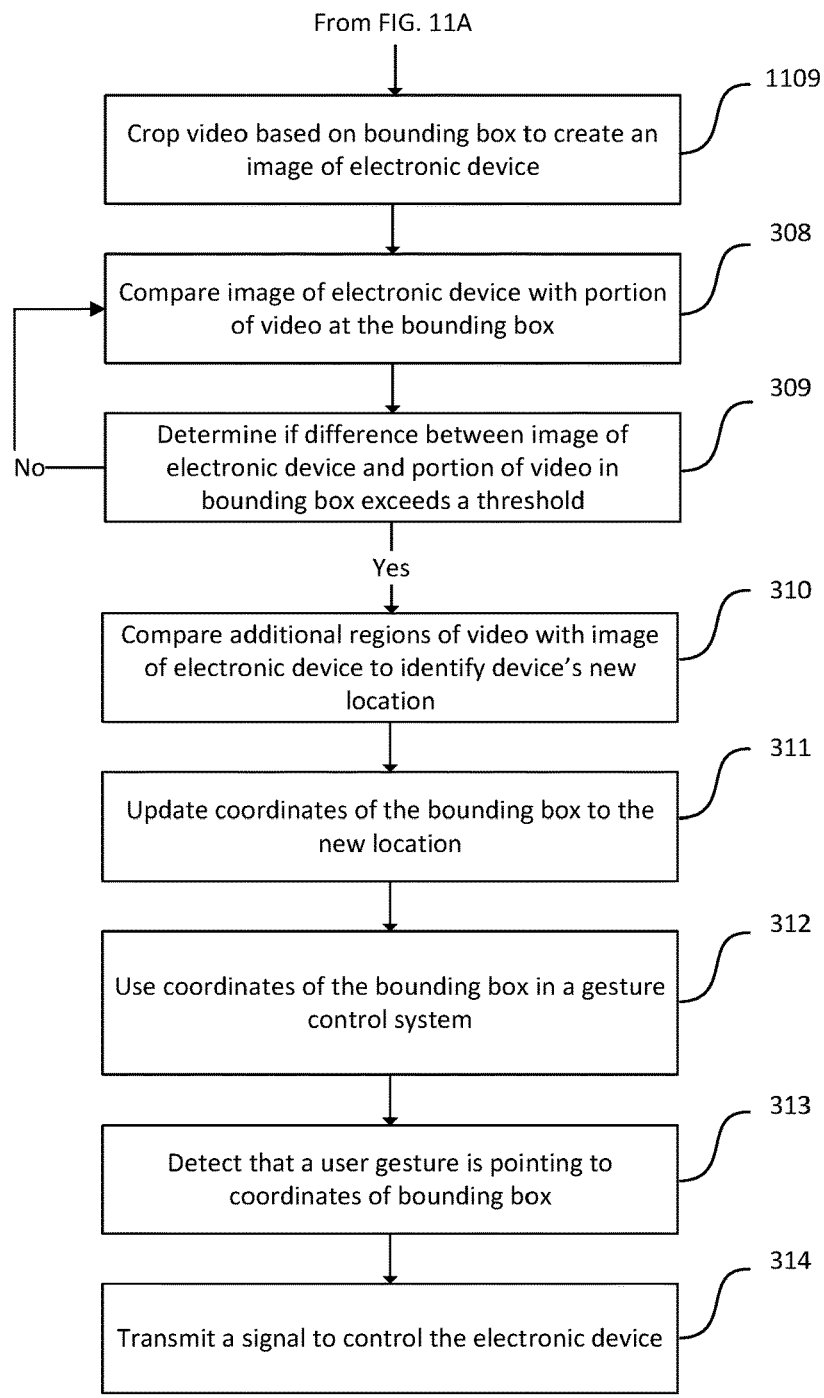

FIGS. 11A-B illustrates a flow chart of an exemplary method 1100 that may be performed in some embodiments. In method 1100, a user may generate a bounding box for an electronic device by pointing at it from different positions in a room.

In step 1101, video of the room is captured from a video camera of the hardware sensor device. In step 1102, the hardware sensor device detects that the user is pointing at an electronic device in the scene. In step 1103, the mobile device may display user interface elements allowing the user to identify which object the user is pointing at, for example, a lamp. In step 1104, the mobile device receives input from the user indicating which object in the room he is pointing at. In step 1105, optionally, the mobile device prompts the user to point at the device from a different location. In step 1106, the user has moved to a different location, and the hardware sensor device detects that the user is pointing at the same electronic device from a different location. In step 1107, the hardware sensor or mobile device triangulates the location of the electronic device by finding the location pointed at by the user from the two different locations. In step 1108, the mobile device generates a bounding box at the location of the electronic device. In step 1109, the video from the hardware sensor device is cropped based on the bounding box to create an image of the electronic device. Steps 308-314 may then be performed as described earlier.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for determining and updating a stored location of an electronic device in a gesture control system:
    capturing video with a video camera on a mobile device;
    displaying the video captured from the mobile device to a user in real-time on the mobile device;
    tracking the location of the user as the user moves to different locations in a room;
    building a three-dimensional representation of the room based on image frames of the video captured from the mobile device and one or more locations of the user;
    displaying user interface elements allowing the placing of a bounding box on the video captured from the mobile device;
    receiving input from the user on the mobile device indicating a bounding box, where the bounding box encloses an electronic device displayed in the video captured from the mobile device, wherein the electronic device is separate from the mobile device;
    capturing video with a video camera on a stationary hardware sensor device, the hardware sensor device being separate from the mobile device and communicably connected to the mobile device by a wireless connection;
    transmitting the video from the stationary hardware sensor device to the mobile device;
    cropping the video from the hardware sensor device based on the bounding box to create an image of the electronic device, wherein the cropping removes pixels outside of the bounding box and does not change the size of the image inside the bounding box;
    storing coordinates of the bounding box associated with the image of the electronic device;
    repeatedly comparing the image of the electronic device with a portion of the video captured from the hardware sensor device at the coordinates of the bounding box;
    when the difference between the portion of the video captured from the hardware sensor device at the coordinates of the bounding box and the image of the electronic device exceeds a threshold, comparing additional regions of the video captured from the hardware sensor device with the image of the electronic device to identify a new location of the electronic device;

updating the coordinates of the bounding box to the new location;

using the coordinates of the bounding box in a gesture control system;

detecting that a user gesture is pointing to the coordinates of the bounding box;

transmitting a signal to control the electronic device.

2. The method of claim 1, wherein the bounding box is a two-dimensional bounding box.

3. The method of claim 1, wherein the bounding box is a three-dimensional bounding box.

4. The method of claim 1, further comprising:

displaying the bounding box and the video captured from the video camera on the mobile device on a touch screen;

receiving a drag motion from the user on the touch screen;

resizing the bounding box according to the drag motion.

5. The method of claim 1, wherein the step of comparing the image of the electronic device with the portion of the video captured from the hardware sensor device at the coordinates of the bounding box is performed at least once per second.

6. The method of claim 1, further comprising:

detecting one or more gestures from a plurality of users;

determining that the one or more gestures indicate the coordinates of two or more electronic devices;

controlling the two or more electronic devices based on the one or more gestures.

7. A method for determining and updating a stored location of an electronic device in a gesture control system:

capturing video with a video camera on a stationary hardware sensor device;

transmitting the video from the stationary hardware sensor device to a mobile device of a user, the hardware sensor device being separate from the mobile device and communicably connected to the mobile device by a wireless connection;

displaying the video to the user in real-time on the mobile device;

displaying user interface elements allowing the placing of a bounding box on the video;

receiving input from the user on the mobile device indicating a bounding box, where the bounding box encloses an electronic device displayed in the video, wherein the electronic device is separate from the mobile device;

cropping the video based on the bounding box to create an image of the electronic device;

storing coordinates of the bounding box associated with the image of the electronic device, wherein the cropping removes pixels outside of the bounding box and does not change the size of the image inside the bounding box;

repeatedly comparing the image of the electronic device with a portion of video at the coordinates of the bounding box;

when the difference between the portion of video at the coordinates of the bounding box and the image of the electronic device exceeds a threshold, comparing additional regions of the video with the image of the electronic device to identify a new location of the electronic device;

updating the coordinates of the bounding box to the new location;

using the coordinates of the bounding box in a gesture control system;

detecting that a user gesture is pointing to the coordinates of the bounding box;

transmitting a signal to control the electronic device.

8. The method of claim 7, wherein the bounding box is a two-dimensional bounding box.

9. The method of claim 7, wherein the bounding box is a three-dimensional bounding box.

10. The method of claim 7, wherein the coordinates of the bounding box define four corners of the bounding box.

11. The method of claim 7, further comprising:

displaying the bounding box and the video on a touch screen;

receiving a drag motion from the user on the touch screen;

resizing the bounding box according to the drag motion.

12. The method of claim 7, wherein the step of comparing the image of the electronic device with the portion of the video at the coordinates of the bounding box is performed at least once per second.

13. The method of claim 7, further comprising:

detecting one or more gestures from a plurality of users;

determining that the one or more gestures indicate the coordinates of two or more electronic devices;

controlling the two or more electronic devices based on the one or more gestures.

\* \* \* \* \*